United States Patent
Takai

(10) Patent No.: US 9,514,787 B2
(45) Date of Patent: Dec. 6, 2016

(54) MAGNETIC DISK APPARATUS, READ/WRITE CONTROL METHOD, AND CONTROLLER

(75) Inventor: Yoriharu Takai, Kodaira (JP)

(73) Assignee: Kabushiki Kaisha Toshiba, Tokyo (JP)

(*) Notice: Subject to any disclaimer, the term of this patent is extended or adjusted under 35 U.S.C. 154(b) by 49 days.

(21) Appl. No.: 13/560,094

(22) Filed: Jul. 27, 2012

(65) Prior Publication Data

US 2013/0194689 A1 Aug. 1, 2013

(30) Foreign Application Priority Data

Feb. 1, 2012 (JP) .................................. 2012-020270

(51) Int. Cl.
| | | |
|---|---|---|
| *G11B 5/09* | (2006.01) | |
| *G11B 27/36* | (2006.01) | |
| *G11B 20/10* | (2006.01) | |
| *G11B 20/12* | (2006.01) | |
| *G11B 19/04* | (2006.01) | |
| *G11B 20/18* | (2006.01) | |

(52) U.S. Cl.
CPC ................. *G11B 27/36* (2013.01); *G11B 5/09* (2013.01); *G11B 19/045* (2013.01); *G11B 20/10009* (2013.01); *G11B 20/1217* (2013.01); *G11B 20/1883* (2013.01); *G11B 2020/1298* (2013.01); *G11B 2020/1893* (2013.01); *G11B 2020/1896* (2013.01)

(58) Field of Classification Search
None
See application file for complete search history.

(56) References Cited

U.S. PATENT DOCUMENTS

| | | | | |
|---|---|---|---|---|
| 5,392,290 A * | 2/1995 | Brown | ................... | G11B 19/04 360/137 |
| 5,523,903 A * | 6/1996 | Hetzler | ................ | G11B 5/5526 360/48 |
| 6,201,655 B1 * | 3/2001 | Watanabe | .............. | G11B 5/012 360/48 |
| 6,657,805 B2 * | 12/2003 | Nishida | .................. | G11B 19/04 360/53 |

(Continued)

FOREIGN PATENT DOCUMENTS

| | | |
|---|---|---|
| JP | 2007-012139 | 1/2007 |
| JP | 2008-034085 | 2/2008 |
| JP | 2008-077780 | 4/2008 |

OTHER PUBLICATIONS

Japanese Office Action for Patent Application 2012-020270, to which this claims priority, dated May 27, 2014, 4 pages including translation.

*Primary Examiner* — Dismery Mercedes

(74) *Attorney, Agent, or Firm* — Knobbe, Martens, Olson & Bear, LLP

(57) ABSTRACT

According to at least one embodiment, a magnetic disk apparatus includes a magnetic disk, a nonvolatile memory, a determination module, a write module, and a read module. The determination module determines whether the off-track write occurs on a first data sector during a write mode. The write module writes first data in the nonvolatile memory if the determination module determines that the off-track write occurs on the first data sector. The read module reads the first data from one of the magnetic disk and the nonvolatile memory based on a determination result of the determination module.

12 Claims, 15 Drawing Sheets

(56) References Cited

U.S. PATENT DOCUMENTS

| | | | | |
|---|---|---|---|---|
| 6,658,593 B1* | 12/2003 | Ko | G11B 15/52 | 360/48 |
| 7,203,024 B2* | 4/2007 | Lee | G11B 5/59633 | 360/77.08 |
| 7,215,497 B2* | 5/2007 | Urata | G11B 5/012 | 360/53 |
| 7,245,447 B2* | 7/2007 | Zaitsu | G11B 5/5526 | 360/60 |
| 7,394,607 B2* | 7/2008 | Ohno et al. | | 360/60 |
| 7,411,757 B2 | 8/2008 | Chu et al. | | |
| 7,423,828 B2* | 9/2008 | Emo | G11B 5/5582 | 360/53 |
| 7,570,445 B2* | 8/2009 | Alfred | G11B 5/5526 | 360/31 |
| 7,623,312 B2* | 11/2009 | Ehrlich | G11B 5/59627 | 360/71 |
| 7,827,378 B2* | 11/2010 | Feldman | B82Y 25/00 | 365/200 |
| 7,916,421 B1* | 3/2011 | Liikanen | G11B 19/045 | 360/77.01 |
| 8,300,339 B1* | 10/2012 | Nangare | G11B 5/012 | 360/39 |
| 8,587,889 B2* | 11/2013 | Kawabe | G11B 5/012 | 360/57 |
| 8,638,522 B2* | 1/2014 | Matsuo | G11B 5/012 | 360/77.02 |
| 8,665,543 B2* | 3/2014 | Bellorado | G11B 5/012 | 360/25 |
| 8,765,300 B2* | 7/2014 | Nakamura | H01M 4/70 | 29/623.1 |
| 2002/0030915 A1* | 3/2002 | Nishida | G11B 19/04 | 360/60 |
| 2003/0177434 A1* | 9/2003 | Su | G11B 20/1816 | 714/768 |
| 2003/0214743 A1* | 11/2003 | Urata | G11B 5/012 | 360/53 |
| 2007/0236818 A1* | 10/2007 | Emo | G11B 5/5582 | 360/60 |
| 2009/0190246 A1* | 7/2009 | Cho | G11B 5/59616 | 360/39 |
| 2009/0268336 A1* | 10/2009 | Ogawa | G11B 5/012 | 360/75 |
| 2009/0290252 A1* | 11/2009 | Fukase | G11B 5/5582 | 360/77.07 |
| 2010/0232057 A1* | 9/2010 | Sanvido | G11B 5/012 | 360/78.04 |
| 2012/0162806 A1* | 6/2012 | Champion | G11B 5/5582 | 360/53 |
| 2013/0038961 A1* | 2/2013 | Song | G11B 20/1258 | 360/49 |
| 2013/0083417 A1* | 4/2013 | Worrell | G11B 5/012 | 360/45 |

* cited by examiner

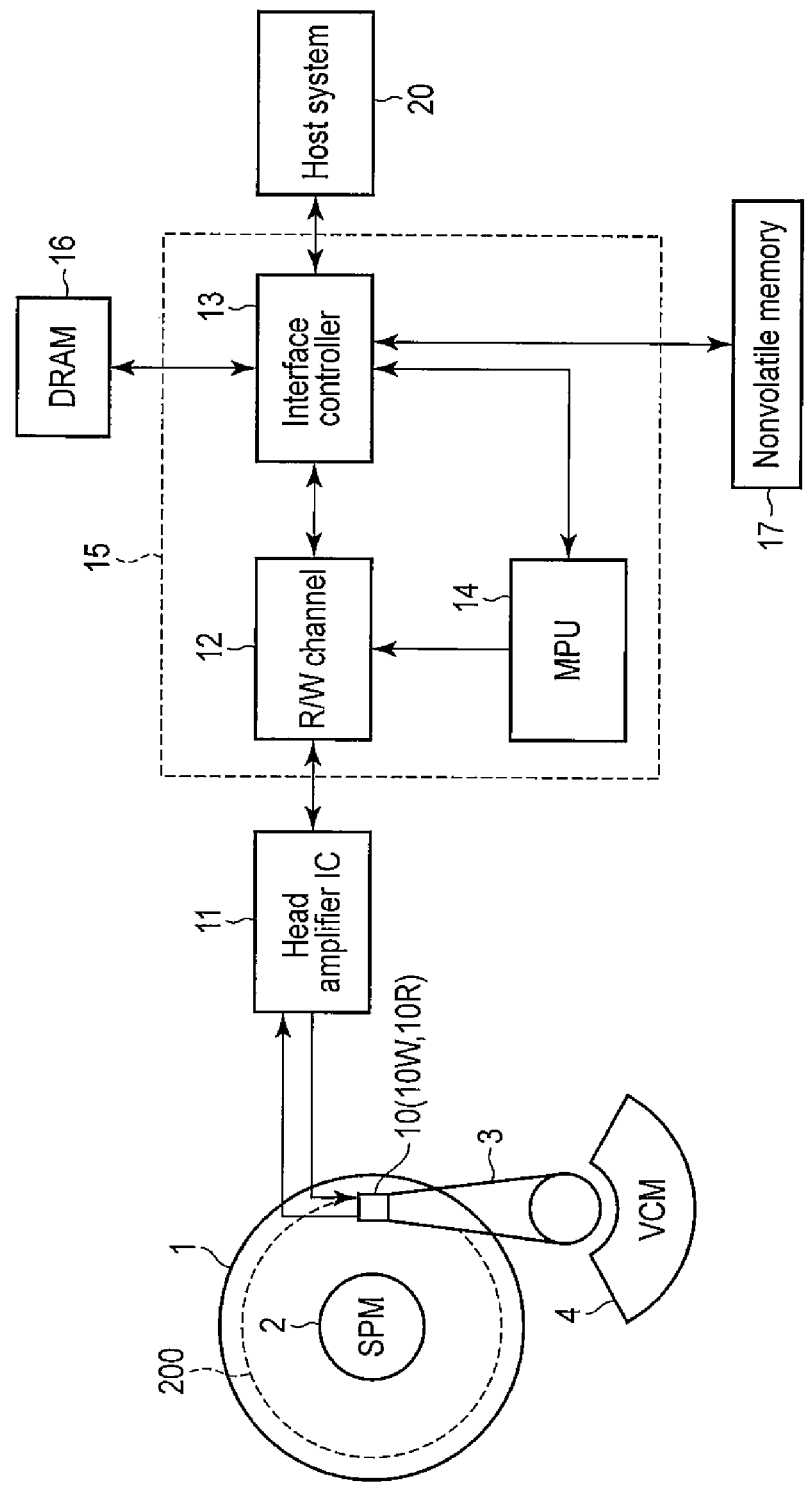
F I G. 1

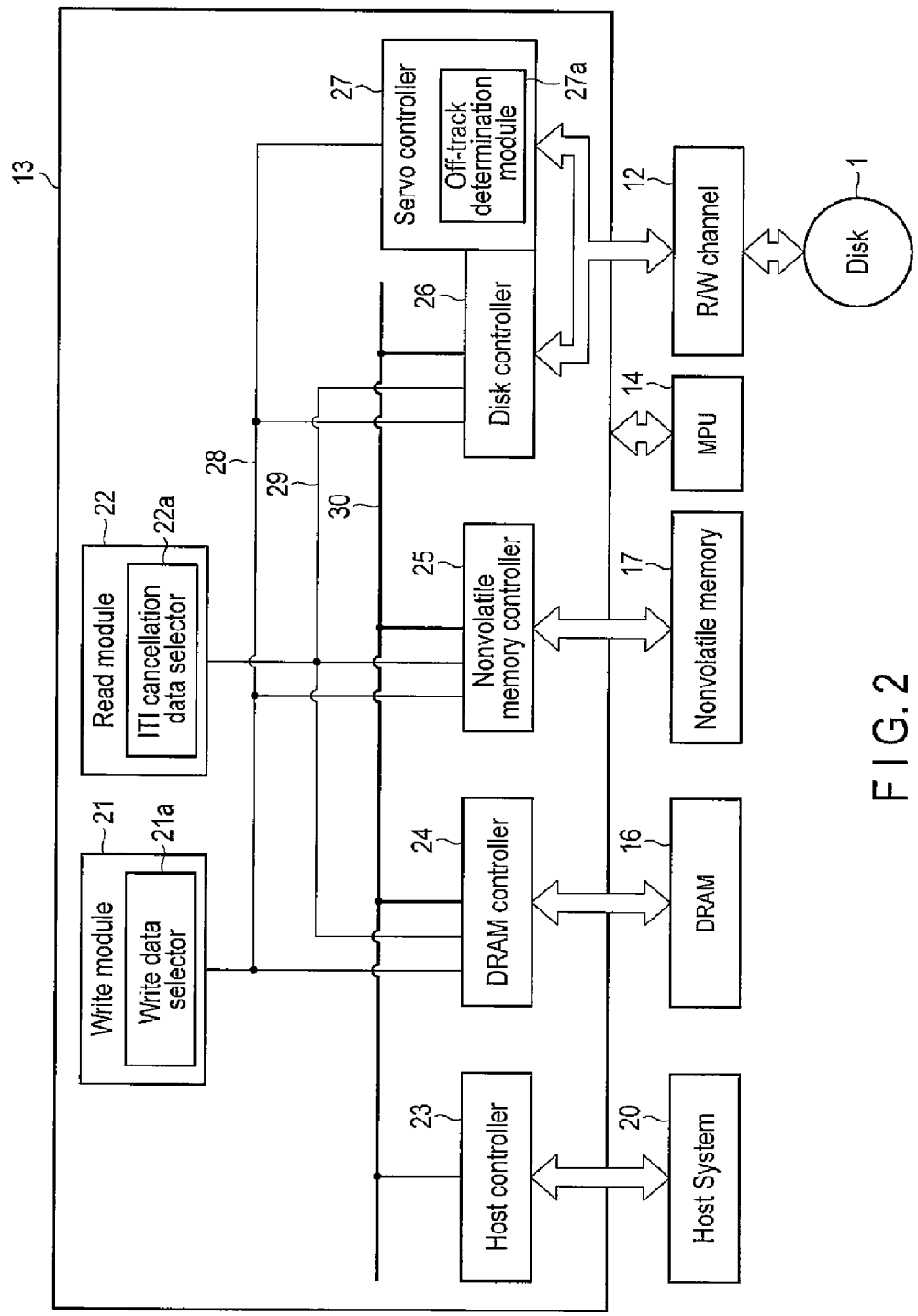
F I G. 2

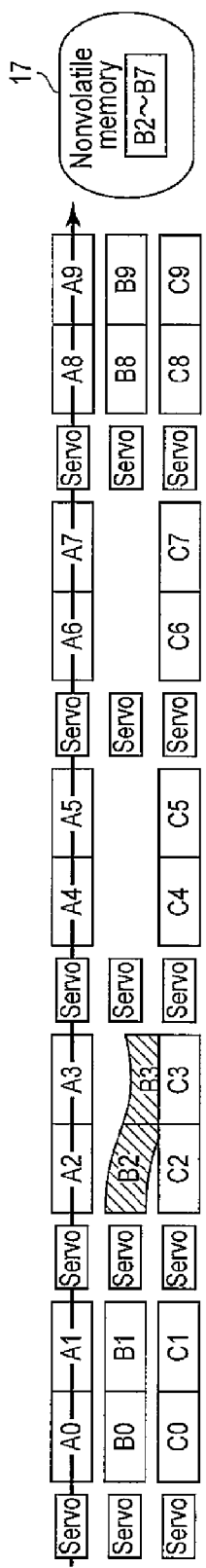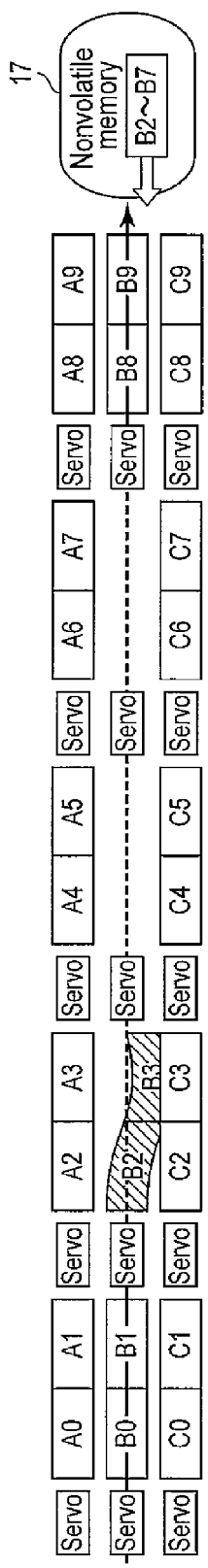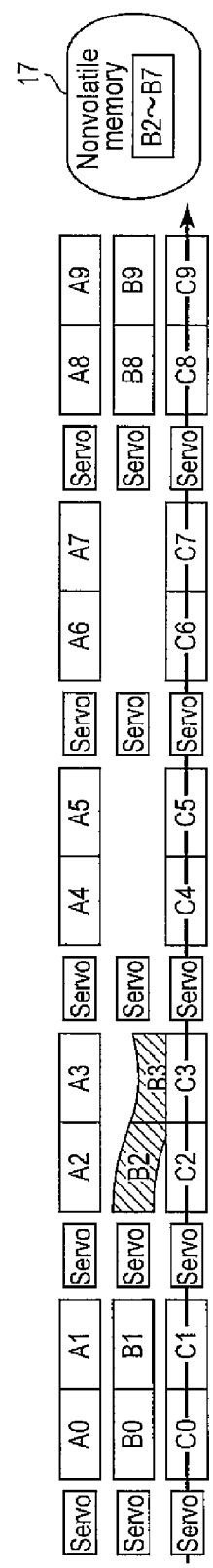
F I G. 6A
F I G. 6B
F I G. 6C

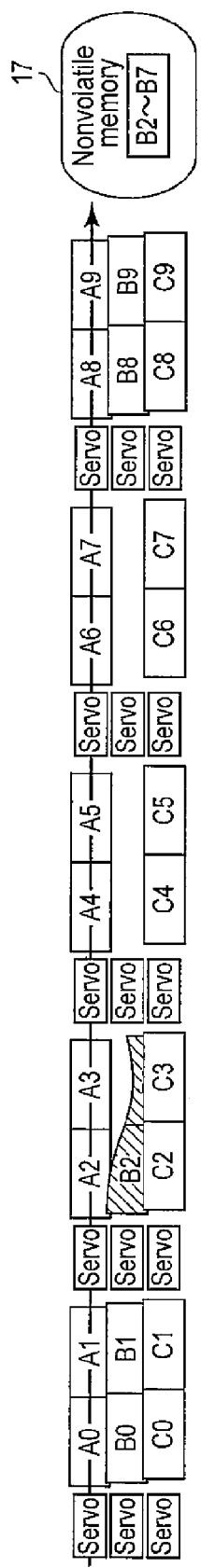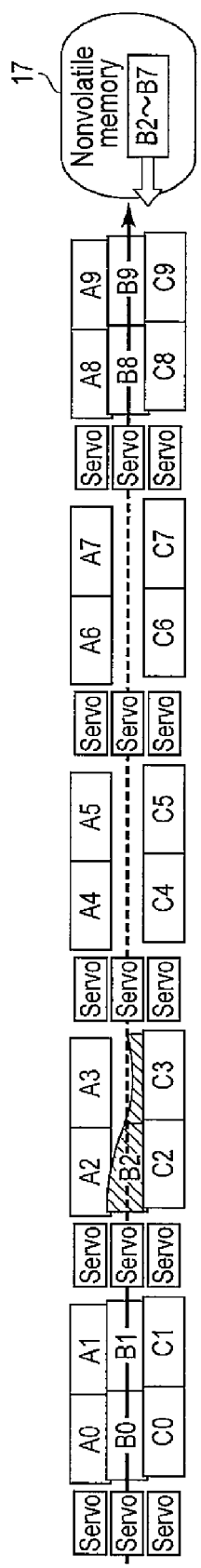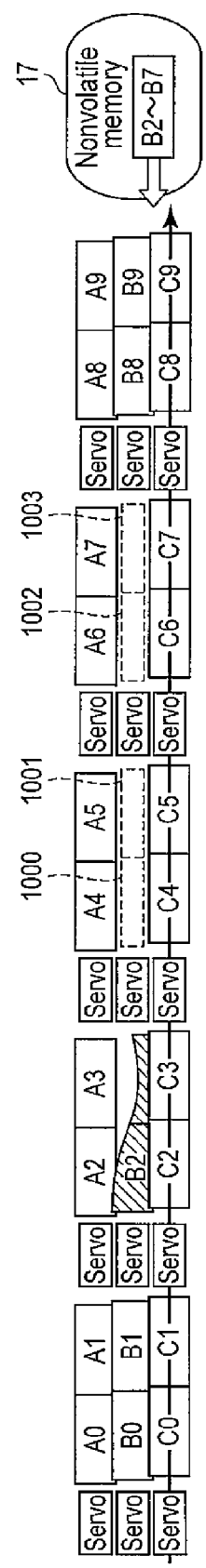
F I G. 10A
F I G. 10B
F I G. 10C

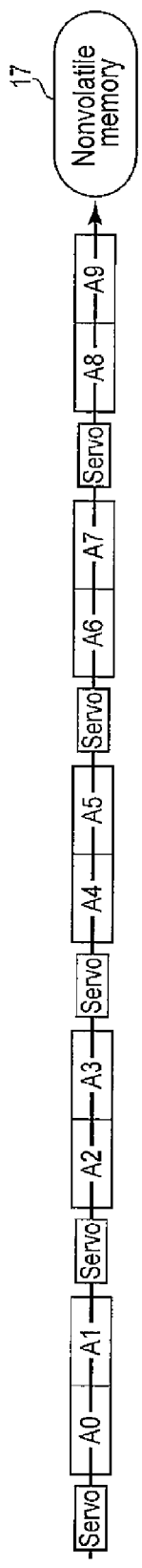
F I G. 11A
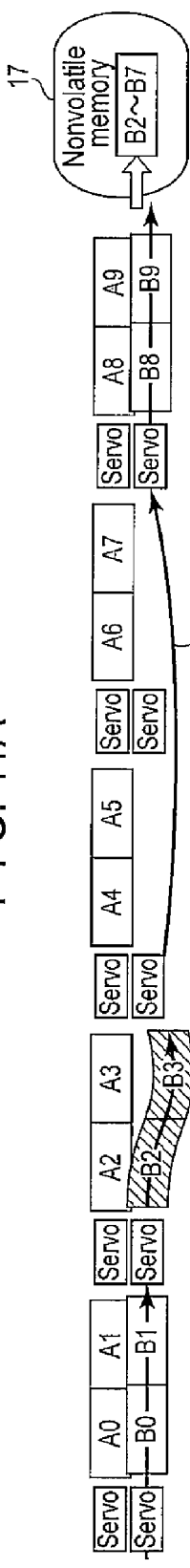
F I G. 11B
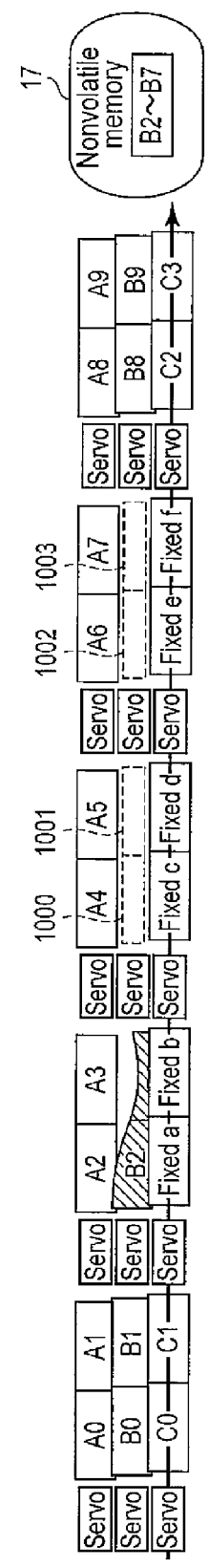
F I G. 11C
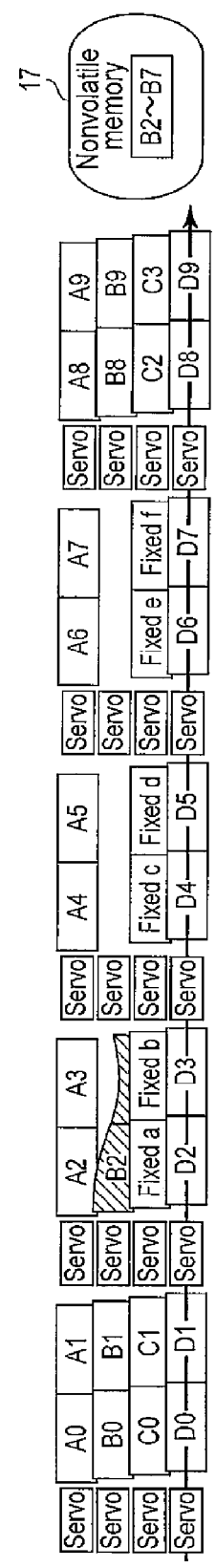
F I G. 11D

|  | Mode1 | Mode2 | Mode3 | Mode4 |
|---|---|---|---|---|
| Write processing at off-track error timing | Continue | Continue | Continue | Continue |
| ITI cancellation function | Not used | Used | Used | Used |
| TPI | Low | High | Medium | High |
| Data efficiency in longitudinal direction | High | High | High | Medium |
| NAND use amount | Small | Large | Small | Small or medium |

F I G. 13

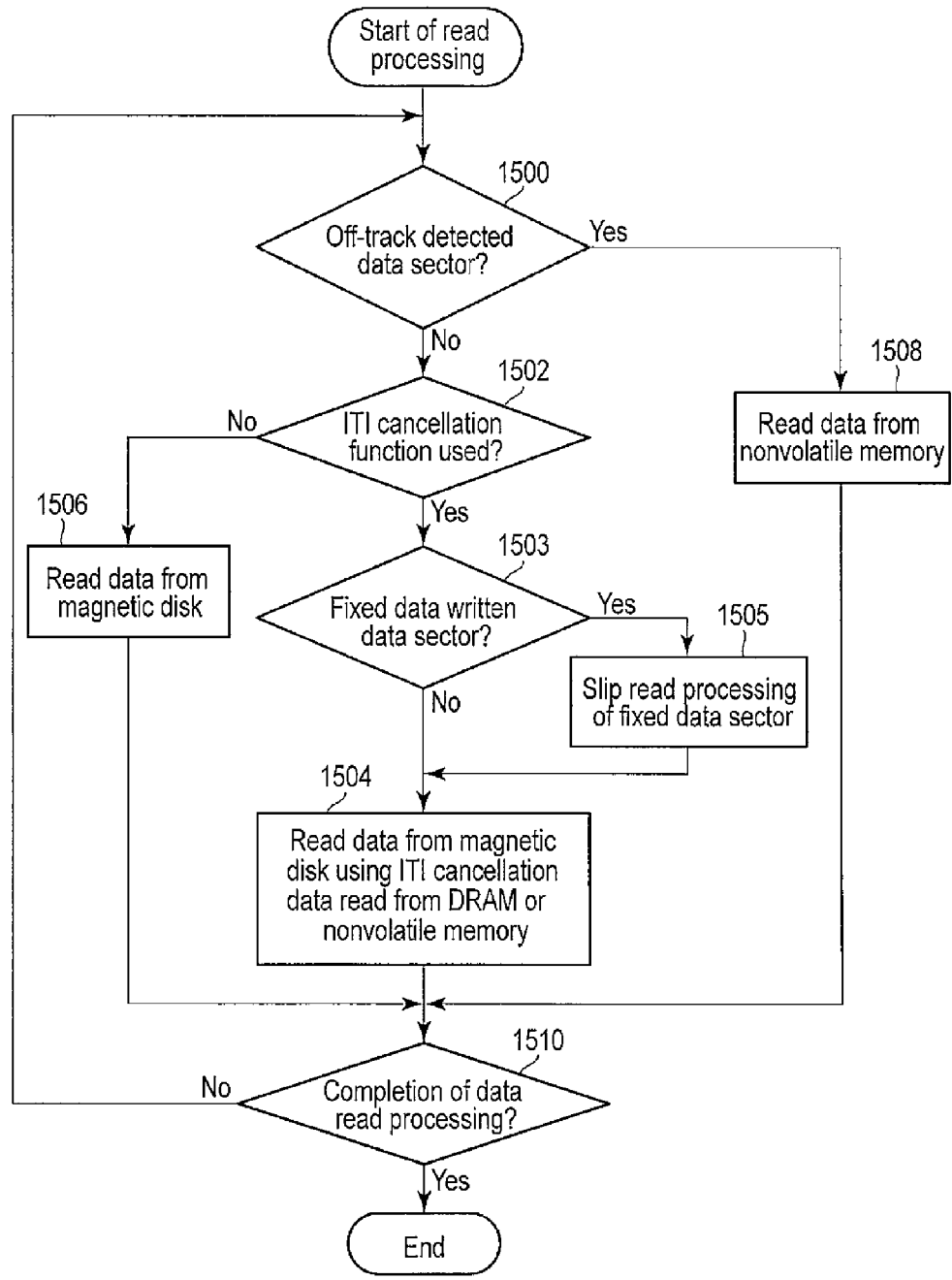
F I G. 15

MAGNETIC DISK APPARATUS, READ/WRITE CONTROL METHOD, AND CONTROLLER

CROSS-REFERENCE TO RELATED APPLICATIONS

This application is based upon and claims the benefit of priority from prior Japanese Patent Application No. 2012-020270, filed Feb. 1, 2012, the entire contents of which are incorporated herein by reference.

FIELD

Embodiments described herein relate generally to a magnetic disk apparatus, read/write control method, and controller, which can control reading and writing with respect to a magnetic disk.

BACKGROUND

In recent years, in the magnetic disk apparatus, a technique for writing data to the magnetic disk at high density has been developed. This technique is called a shingled write recording method for writing data so that neighboring tracks on a magnetic disk overlap each other. In the shingled write recording method, since the neighboring tracks overlap each other, the number of tracks which are recordable per the magnetic disk can be increased, and data can be written at a higher density.

Also, a so-called inter-track interference (ITI) cancellation technique has been developed. With this technique, upon reading data which have been written to the magnetic disk using the shingled write recording method, noise can be canceled using data written to a track which neighbors the track currently being read.

While data are written to a given track using the shingled write recording method, they are unexpectedly written at positions outside the currently written track because of influences such as vibration, thus causing off-track errors. After the off-track error has occurred, processing for writing data (write processing) must be interrupted until an on-track state, that is, the state where allow data to be written to the magnetic disk as a result of tracking control.

Since it is difficult to read data which have been written to an area of the magnetic disk where an off-track error has occurred, those data must be rewritten to the magnetic disk. Furthermore, when data are overwritten in the area where the off-track error has occurred, the influence of magnetic interference on the neighboring tracks often becomes greater.

BRIEF DESCRIPTION OF THE DRAWINGS

FIG. 1 is an exemplary block diagram showing an example of the arrangement of a magnetic disk apparatus according to a first embodiment;

FIG. 2 is an exemplary block diagram showing an example of the arrangement of an interface controller in the magnetic disk apparatus according to the first embodiment;

FIGS. 6A, 6B, and 6C are exemplary views showing a read method of data written by the shingled write recording method upon occurrence of the off-track error according to the first embodiment;

FIGS. 10A, 10B, and 10C are exemplary views showing a read method of data written by the shingled write recording method upon occurrence of the off-track error according to the third embodiment;

FIGS. 11A, 11B, 11C, and 11D are exemplary views showing a data write method based on the shingled write recording method upon occurrence of an off-track error according to a fourth embodiment;

FIGS. 12A, 12B, 12C, and 12D are exemplary views showing a read method of data written by the shingled write recording method upon occurrence of the off-track error according to the fourth embodiment;

FIG. 13 is an exemplary view for explaining differences of four modes of the shingled write recording method upon occurrence of an off-track error according to a fifth embodiment;

FIG. 15 is an exemplary flowchart showing a read processing sequence of data written by the shingled write recording method upon occurrence of the off-track error according to the fifth embodiment.

DETAILED DESCRIPTION

Figure 3:
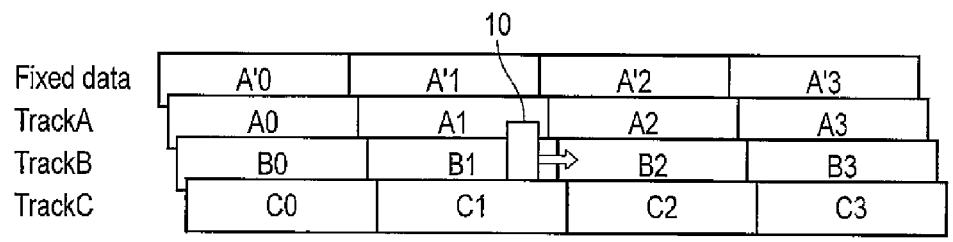
FIG. 3 is an exemplary view showing an example of the configuration of tracks on a magnetic disk written by the shingled write recording method according to the first embodiment.

In general, according to one embodiment, a magnetic disk apparatus includes a magnetic disk, a nonvolatile memory, a determination module, a write module, and a read module. The magnetic disk includes a first data sector, first data being recorded in the first data sector while neighboring tracks partially overlapping each other. The determination module determines whether off-track write occurs on the first data sector during to mode. The write module writes the first data in the nonvolatile memory if the determination module determines that off-track write occurs on the first data sector. The read module reads the first data from one of the magnetic disk and the nonvolatile memory based on a determination result of the determination module.

Various embodiments will be described hereinafter with reference to the accompanying drawings.

First Embodiment

The first embodiment will be described below with reference to the drawings.

FIG. 1 is a block diagram showing principal parts of a magnetic disk apparatus according to this embodiment.

As shown in FIG. 1, the magnetic disk apparatus roughly includes a head-disk assembly (HDA), a head amplifier integrated circuit (to be referred to as a head amplifier IC hereinafter) 11, and a hard disk controller (HDC) 15.

The HDA has a magnetic disk 1 as a recording medium, a spindle motor (SPM) 2, an arm 3 which mounts a head 10, and a voice coil motor (VCM) 4. The magnetic disk 1 is rotated by the spindle motor 2. The arm 3 and VCM 4 configure an actuator. The actuator controls to move the head 10 mounted on the arm 3 to a designated position on the magnetic disk 1 by driving the VCM 4.

The head 10 has a write head 10W and read head 10R mounted on a slider as a main body. The write head 10W writes data (write data) to a track 200 on the magnetic disk 1 (to be referred to as a write mode hereinafter). The read head 10R reads data (read data) recorded in the data track 200 on the magnetic disk 1 (to be referred to as a read mode hereinafter).

Respective blocks shown in FIG. 1 will be described below in signal transmission orders in the write and read modes.

Functions of the respective blocks in FIG. 1 in the write mode will be described first.

A host system 20 is connected to an interface controller 13 in the magnetic disk apparatus. The host system 20 sends the write data to the interface controller 13.

The HDC 15 is configured by a 1-chip integrated circuit including the interface controller 13, a read/write (R/W) channel 12, and a microprocessor (MPU) 14.

The interface controller 13 is connected to the host system 20, the R/W channel 12, the MPU 14, a DRAM 16, and a nonvolatile memory 17. The interface controller 13 temporarily stores the write data received from the host system 20 in the DRAM 16, and then transfers the write data to the R/W channel 12 or the nonvolatile memory 17 based on an instruction from the MPU. Note that the write data received from the host system 20 may be transferred to the R/W channel 12 or the nonvolatile memory 17 without being temporarily stored in the DRAM 16.

Although the DRAM 16 and the nonvolatile memory 17 are not included in the HDC 15, the explanation of the DRAM 16 and the nonvolatile memory 17 will be described below.

The DRAM 16 is a volatile memory, which is connected to the interface controller 13, and the DRAM 16 can temporarily store data such as the write data transferred from the interface controller 13. The DRAM 16 serves as a buffer which temporarily stores the data such as the write data.

The nonvolatile memory 17 is connected to the interface controller 13. The nonvolatile memory 17 is a high-speed and large-capacity nonvolatile memory. The nonvolatile memory 17 can store the data such as the write data transferred from the interface controller 13. Note that the nonvolatile memory 17 can store data not temporarily even in a power-OFF state, unlike data stored in the magnetic disk 1, and may serve as an alternate memory of the magnetic disk 1.

The MPU 14 is connected to the interface controller 13 and the R/W channel 12. The MPU 14 executes arithmetic processing and the like for the interface controller 13 and R/W channel 12. The MPU 14 is a main controller of a drive, and executes servo control for positioning the head 10 by controlling the VCM 4.

The R/W channel 12 is connected to the interface controller 13, MPU 14, and head amplifier IC 11. The R/W channel 12 includes a write channel which executes signal processing of the write data, and a read channel which executes signal processing of the read data. The R/W channel 12 performs signal processing (for example, encoding) to write data transferred from the interface controller 13 using the write channel. The R/W channel 12 sends the encoded write data to the head amplifier IC 11.

The head amplifier IC 11 is connected to the head 10 and R/W channel 12. The head amplifier IC 11 has a write driver and a pre-amplifier. The write driver supplies write currents to the write head 10W, according to the write data output from the R/W channel 12. The write head 10W writes data to the disk 1 based on the supplied write currents. Note that the pre-amplifier will be described later.

Functions of the respective blocks shown in FIG. 1 in the read mode will be described below. Note that a description of the same components and functions as the contents described above in association with the write mode will not be given.

The pre-amplifier included in the head amplifier IC 11 amplifies a read signal read by the read head 10R, and transfers the amplified read signal to the R/W channel 12.

The read channel included in the R/W channel 12 executes processing (for example, decoding) based on the signal sent from the head amplifier IC 11, and sends the decoded signal to the interface controller 13 as read data.

The interface controller 13 executes, for example, off-track determination based on the read data sent from the R/W channel 12. Also, the interface controller 13 controls the DRAM 16 to temporarily store the read data sent from the R/W channel 12. Note that the interface controller 13 may send the read data sent from the R/W channel 12 to the host system 20 without controlling the DRAM 16 to temporarily store the read data.

The interface controller 13 reads the temporarily stored read data from the DRAM 16, and sends the read data to the host system 20. The interface controller 13 can read data from the nonvolatile memory 17 in place of reading data from the magnetic disk 1.

Detailed functions of the interface controller 13 will be described below with reference to FIG. 2.

The interface controller 13 includes a write module 21, a read module 22, a host controller 23, a DRAM controller 24, a nonvolatile memory controller 25, a disk controller 26, and a servo controller 27.

The host controller 23, the DRAM controller 24, the nonvolatile memory controller 25, and the disk controller 26 are connected to each other via an internal data bus 30.

The write module 21, the DRAM controller 24, the nonvolatile memory controller 25, and the servo controller 27 are connected to each other via an internal control bus 28.

The read module 22, the DRAM controller 24, the nonvolatile memory controller 25, and the disk controller 26 are connected to each other via an internal data bus 29.

The host controller 23 and the host system 20, the DRAM controller 24 and the DRAM 16, the nonvolatile memory controller 25 and the nonvolatile memory 17, the disk controller 26 and the R/W channel 12, and the servo controller 27 and R/W channel 12 are respectively connected to each other via external buses.

Functions and the like of the interface controller 13 will be distinctly described below in association with the read mode and the write mode, respectively.

Functions and the like of the interface controller 13 in the write mode will be described first.

The host controller 23 sends write data sent from the host system 20 to the DRAM 16 via the internal bus 30 and DRAM controller 24, so as to store that write data in the DRAM 16 as buffer data.

The write module 21 includes a write data selector 21a. The write data selector 21a switches write locations of data sent from the host system 20 based on occurrence of a write error such as the off-track error. Writable locations include the magnetic disk 1 and the nonvolatile memory 17. The write data selector 21a selects whether write data stored in the DRAM 16 are to be written in the disk 1 or the nonvolatile memory based on a signal (to be referred to as an off-track detection signal hereinafter; to be described in detail later) sent from the servo controller 27 via the internal control bus 28. The write module 21 executes control for writing the write data stored in the DRAM 16 in one of the disk 1 and the nonvolatile memory via the internal bus 28 based on the selection result of the write data selector 21a.

In this embodiment, when the off-track error is detected, the write data are then transferred to the nonvolatile memory 17 until the off-track error ceases to be detected. More specifically, if the write data selector 21a selects that the write data are to be written in the nonvolatile memory 17, the write module 21 sends the write data stored in the DRAM 16 to the nonvolatile memory 17 via the internal data bus 30 and the nonvolatile memory controller 25.

The off-track detection signal indicates occurrence of the off-track error. As will be described later with reference to FIG. 5C, it is assumed that the off-track error is an error of an off-track in a direction of a track which has not been written (recorded) yet by the shingled write recording method. The off-track means that the center of the track 200 on the magnetic disk 1 and the center of the write head 10W deviate from each other. Whether or not the off-track error has occurred is determined by an off-track determination module 27a.

The servo controller 27 includes the off-track determination module 27a. The servo controller 27 executes processing associated with servo data sent from the R/W channel 12.

The off-track determination module 27a determines, based on servo information (for example, position information of the write head 10W and the like) included in the servo data, whether or not the off-track error has occurred. When the off-track error has occurred, that is, when the off-track error is detected, the off-track determination module 27a sends the off-track detection signal to the write data selector 21a.

More specifically, the off-track determination module 27a determines "NG" based on the servo information if the off-track error has occurred. The off-track determination module 27a determines "OK" if the off-track error does not occur, that is, if the center of the track 200 and the center of the write head 10W do not deviate from each other (on-track). In this way, the off-track determination module 27a may determine occurrence of the off-track error.

If the off-track determination module 27a determines that the off-track error has occurred, a property of the off-track is stored in the DRAM 16, the nonvolatile memory 17, an internal register or SRAM (not shown) of the interface controller 13, or the like. The property of the off-track includes an address on the magnetic disk 1 which indicates an area where the off-track error has occurred (off-track address), and/or a data size of the area where the off-track error has occurred. The off-track address is, for example, a start address of the area where the off-track error has occurred, an end address of the area where the off-track error has occurred, or the like. The property of the off-track may be, for example, information as a combination of the start and the end addresses, information as a combination of the start address and the data size of the area where the off-track error has occurred, or the like.

Functions and the like of the interface controller 13 in the read mode will be described below.

Initially, a description will be given under the assumption that data written in one of the disk 1 and nonvolatile memory 17 is to be read.

The read module 22 reads data from one of the disk 1 and the nonvolatile memory 17, and temporarily stores the read data in the DRAM 16. More specifically, the read module 22 sends a read request signal required to read data from the nonvolatile memory 17 or the disk 1 to the nonvolatile memory controller 25 and/or the disk controller 26 via the internal control bus 29. The nonvolatile memory controller 25 or the disk controller 26 reads data from the nonvolatile memory 17 or the disk 1 based on the read request signal. The nonvolatile memory controller 25 or the disk controller 26 sends the read data to the DRAM 16 via the internal data bus 30. Note that the data read from the nonvolatile memory 17 may be sent to the host system without being stored in the DRAM 16.

Data to be temporarily stored in the DRAM 16 (to be referred to as temporary stored data hereinafter) are data for one round of a track having, for example, a data sector corresponding to a position of the read head 10R on the magnetic disk 1 (to be referred to as a read data sector hereinafter). Data for one round of the track having the read data sector are those for one round of a track (to be referred to as a neighboring track hereinafter) which neighbors a currently read track (to be referred to as a read track hereinafter) and which was read before reading of the read track. More specifically, the temporary stored data are data corresponding to a track for one round from a data sector (to be referred to as a neighboring data sector hereinafter) which neighbors the read data sector and is included in the neighboring track to a data sector which neighbors the read data sector in the read track and was read before reading of the read data sector.

The DRAM controller 24 stores, for example, the data for one round of the neighboring track, in the DRAM 16. After that, the DRAM controller 24 sends the temporary stored data stored in the DRAM 16 to the host system 20, so as to maintain a state in which the data for one round of a track are stored in the DRAM 16, according to new data sent to the DRAM 16.

Note that the read module 22 may temporarily store data read from the nonvolatile memory 17 or the disk 1 in the DRAM 16, in addition, may send data read from the nonvolatile memory 17 or the disk 1 to the host system 20 via the internal data bus 30.

The following description will be given under the assumption that data written in the magnetic disk 1 by the shingled write recording method are read using an ITI cancellation function.

The shingled write recording method is a method that allows to increase the capacity of the magnetic disk 1 and that allows to record data on the magnetic disk 1 at a higher density. With the shingled write recording method, data can be written in a shingle pattern while closing up track pitches so that neighboring tracks overlap each other to have a plurality of track as a write unit group.

The ITI cancellation function is a function of reading the magnetic disk 1 while canceling inter-track interference components (noise) which are generated between tracks using data in a data sector in the neighboring track (ITI cancellation data) when data written to the magnetic disk 1 by the shingled write recording method are to be read. For example, when the read data sector is to be read, data in the aforementioned neighboring data sector corresponds to the ITI cancellation data.

Read processing using the ITI cancellation function will be practically described below with reference to FIG. 2.

The read module 22 includes an ITI cancellation data selector 22a. The ITI cancellation data are stored in the DRAM 16 and/or the nonvolatile memory 17. The ITI cancellation data selector 22a selectively reads the ITI cancellation data from one of the DRAM 16 and the nonvolatile memory 17. The ITI cancellation data selector 22a transfers the ITI cancellation data to the R/W channel 12. The ITI cancellation data selector 22a reads data from the magnetic disk 1 while executing ITI cancellation using the ITI cancellation data.

The ITI cancellation data is data in the neighboring data sector stored in the DRAM 16 or the nonvolatile memory 17. The ITI cancellation data selector 22a sends, the ITI cancellation data from one of the DRAM 16 and the nonvolatile memory 17, to the R/W channel 12 based on the property of the off-track.

The ITI cancellation function as mentioned above is, in FIG. 2, for example, a function for canceling noise from data of the read data sector using data of the read data sector read from the magnetic disk 1 and the ITI cancellation data sent to the R/W channel 12. For example, the noise may be canceled by controlling the R/W channel 12 to subtract the value of the ITI cancellation data from the value of the data in the read data sector.

The shingled write recording method will be practically described below with reference to FIG. 3.

FIG. 3 is assumed a case in which four tracks form one shingled write recording unit in shingled write recording method. The four tracks include a fixed data track on which the fixed data are written, track A, track B, and track C in turn from the upper side of FIG. 3. The fixed data are those of predetermined repetitive patterns or the like. Note that a case will be assumed wherein data are written from the outer periphery side of the magnetic disk 1 toward the inner periphery side. The upper side of FIG. 3 corresponds to the outer periphery side of the magnetic disk 1, and the lower side of FIG. 3 corresponds to the inner periphery side of the magnetic disk 1. Assuming that data are written from the inner periphery side of the magnetic disk 1 toward the outer periphery side, the upper side of FIG. 3 may correspond to the inner periphery side of the magnetic disk 1, and the lower side of FIG. 3 may correspond to the outer periphery side of the magnetic disk 1.

The shingled write recording method in the write mode will be described first.

The write module 21 writes data to the magnetic disk 1 in the order of the fixed data track, track A, track B, and track C.

The fixed data are those which are set in advance in the magnetic disk apparatus or the like. That is, the fixed data are written first by the shingled write recording method, and are used to read data in the track A using the ITI cancellation function in the order of writings by the shingled write recording method. The fixed data track is a data track on which the fixed data are written. In FIG. 3, the fixed data track has data sectors A'0 to A'3. The fixed data are written in the order from the data sectors A'0 to A'3, that is, in turn from the left side to the right side in FIG. 3.

The track A neighbors the fixed data track, and data are written to the track A after the fixed data are written to the fixed data track. Data of the track A are written so that a part of the track A, that is, a part of the upper side of the track A in FIG. 3 overlaps a part of the fixed data track, that is, a part of the lower side of the fixed data track in FIG. 3, that is, they are overwritten on a part of the fixed data. The track A has data sectors A0 to A3, and data of the track A are written in turn from the data sectors A0 to A3, that is, in turn from the left side to the right side in FIG. 3. Likewise, data of the track B are written so that a part of the track A overlaps a part of the track B, as shown in FIG. 3. Also, data of the track C are written so that a part of track B overlaps a part of the track C.

The read processing of data written by the shingled write recording method will be described below with reference to FIG. 3.

The head 10 reads data in the order from the data sectors M0 to A'3 in the fixed data track. After that, the head 10 reads data from the data sectors A0 to A3 in the track A, from the data sectors B0 to B3 in the track B, and from the data sectors C0 to C3 in the track C. FIG. 3 shows that the head 10 moves from the data sectors B1 to B2 in the track B. Note that servo data areas are not shown in FIG. 3.

The head 10 is located on the data sector B1, the data sector B1 corresponds to the aforementioned read data sector, and the data sector A1 corresponds to the neighboring data sector in FIG. 3. In this case, the ITI cancellation data required to read the data sector B1 corresponds to the data sector A1.

The configuration between a plurality of tracks written by the shingled write recording method and the positions of the head 10 will be described below with reference to FIG. 4.

Figure 4:
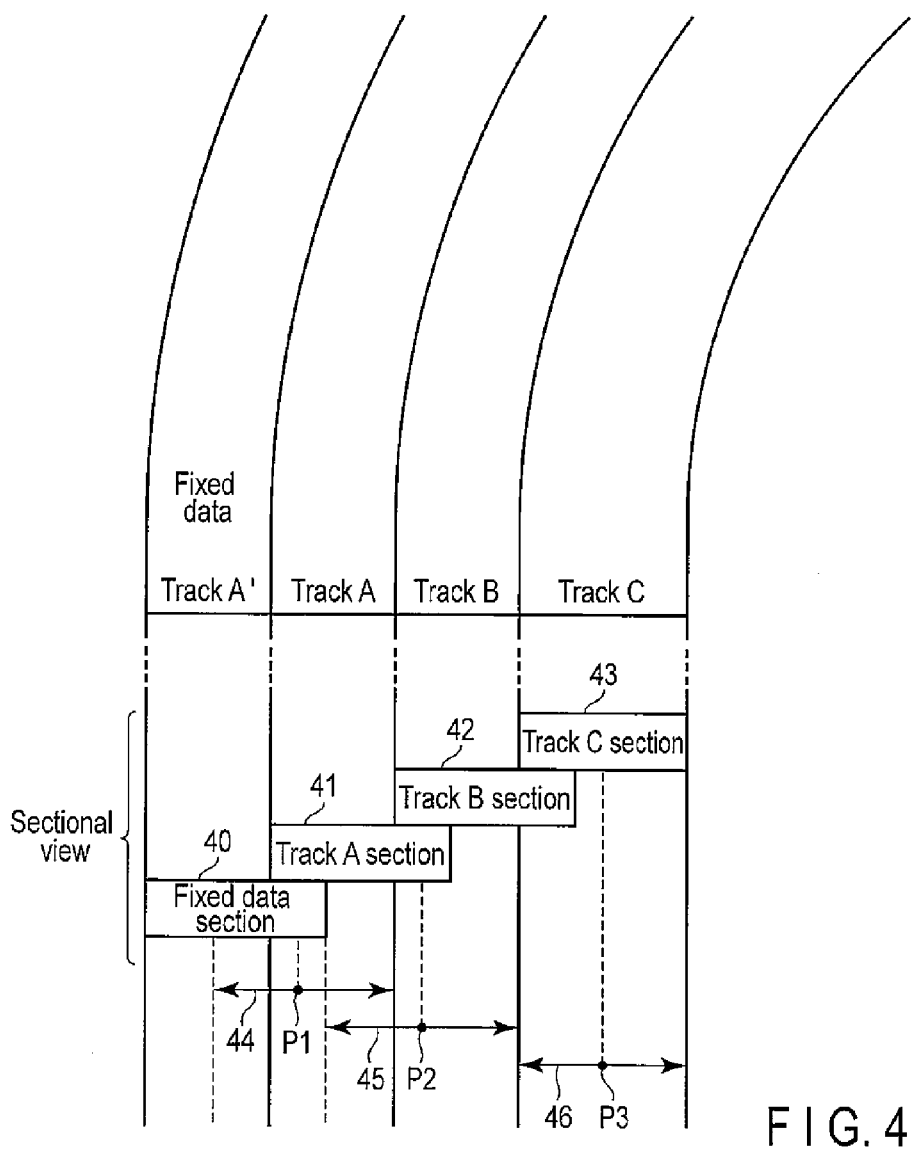
FIG. 4 shows an exemplary sectional view of the tracks shown in FIG. 3 and exemplary positions of a read head upon reading these tracks according to the first embodiment.

The upper side of FIG. 4 shows a plurality of tracks on the magnetic disk 1, which correspond to the plurality of tracks written by the shingled write recording method shown in FIG. 3. The lower side of FIG. 4 shows sectional views of the plurality of tracks written by the shingled write recording method and corresponding to the upper side of FIG. 4. These sectional views are used to explain the principle of the shingled write recording method. Note that in FIG. 4, the left side of FIG. 4 is the outer periphery side of the magnetic disk 1, and the right side of FIG. 4 is the inner periphery side of the magnetic disk 1.

With reference to the sectional views in FIG. 4, a track A section 41 overlaps a fixed data section 40. A part on the inner periphery side of the track A section 41 is overwritten by a part on the outer periphery side of a track B section 42. Likewise, a part on the inner periphery side of the track B section 42 is overwritten by a part on the outer periphery side of a track C section 43. In this manner, parts of the tracks A and B are respectively overwritten by parts of the tracks B and C. For this reason, the noise is required to be canceled using the ITI cancellation function upon reading the tracks A and B.

The positions of the head 10 will be described below.

In FIG. 4, reference numerals 44, 45, and 46 respectively denote read ranges upon reading data in the tracks A, B, and C. Central positions of the read head 10R upon reading data in the tracks A, B, and C are respectively indicated by central positions P1, P2, and P3.

The read mode will be described below. Initially, data of the track A is read within the range representing by the reference numeral 44 using the predetermined fixed data as the ITI cancellation data. Data of the track B is read within the range representing by the reference numeral 45. In this case, the already read data of the track A is used as the ITI cancellation data. Likewise, data of the track C is read within the range representing by the reference numeral 46. In this case, the already read data of the track B is used as the ITI cancellation data. The central position P3 of the read head 10R upon reading data in the track C corresponds to the center of the track C section 43. By contrast, the central positions P1 and P2 are offset from the centers of the track B section 41 and track C section 42 toward the outer periphery side, so as not to read data in the tracks B and C. In this manner, by offsetting the central positions P1 and P2, the respective tracks can be read using the ITI cancellation function in the order of data tracks written by the shingled write recording method.

Write processing upon occurrence of the off-track error will be described below with reference to FIGS. 5A to 5C.

Note that in this embodiment it is assumed that the shingled write recording method in which the degree of overlap between tracks is low. For this reason, in this case, the aforementioned ITI cancellation function need not be used in the read mode. The fixed data track described with reference to FIGS. 3 and 4 is not shown in FIGS. 5A, 5B, 5C, 6A, 6B, 6C, 7A, 7B, 7C, 7D, 8A, 8B, 8C, 9A, 9B, 9C, 10A, 10B, 10C, 11A, 11B, 11C, 11D, 12A, 12B, 12C, and 12D for the sake of illustrative convenience.

Figure 5A:
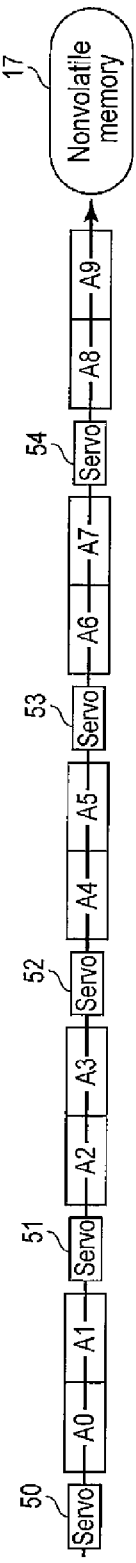
FIGS. 5A, 5B, and 5C are exemplary views showing a data write method based on the shingled write recording method upon occurrence of the off-track error according to the first embodiment.

FIG. 5A shows write processing with respect to the track A. Data sectors A0 and A1 are located between servo area 50 and servo area 51. Likewise, data sectors A2 and A3 are located between the servo area 51 and servo area 52. Data sectors A4 and A5 are located between the servo area 52 and servo area 53. Data sectors A6 and A7 are located between the servo area 53 and servo area 54.

The write head 10W moves in a direction of an arrow in FIG. 5A, and writes data in respective data sectors A0 to A9.

Note that as for the determination of the off-track, if the off-track error has occurred on the data sectors A0 and A1, this determination of the off-track is executed based on servo data in the servo area 51.

Figure 5B:
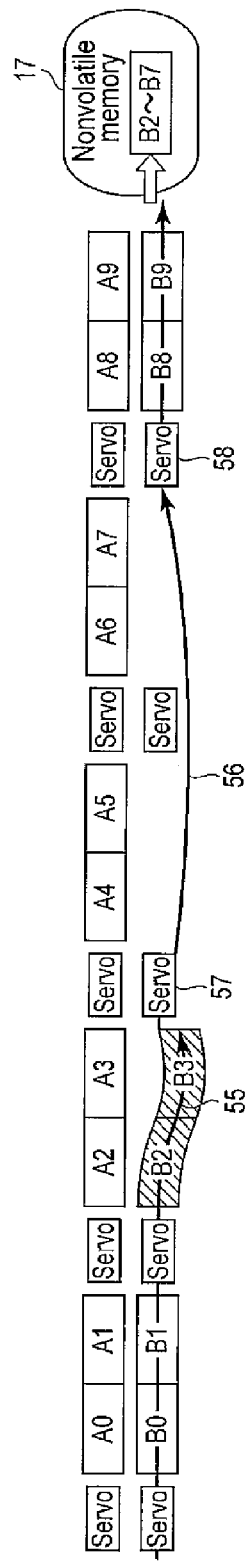

FIG. 5B shows write processing with respect to the track B. Although these tracks A and B overlap each other to have a low degree of overlap, they are illustrated without any overlapping for the sake of illustrative convenience. Also, FIG. 5C and FIGS. 6A, 6B, and 6C to be described later also illustrate tracks without any overlapping due to a low degree of overlap for the sake of illustrative convenience.

FIG. 5B illustrates a case in which the off-track error has occurred on the data sectors B2 and B3. The data sectors B2 and B3 will be referred to as off-track data sectors hereinafter. After the data sectors B0 and B1, which are to be read prior to the off-track data sectors, are read, read data are sent to the DRAM 16. Next, on the off-track data sectors, the write head 10W (not shown in FIGS. 5A to 5C) moves, as indicated by an arrow 55, thus causing an off-track error. Note that occurrence of the off-track error on the off-track data sectors is determined based on servo data in a servo area 57.

If the off-track error has occurred, data to be ten to the magnetic disk 1 are written to the nonvolatile memory 17 until the off-track error occurs. FIG. 5B illustrates that the off-track error does not occur, that is, a state of the on-track is detected based on the servo data in a servo area 58. A write gate in an interval from the data sectors B2 to B7 is off, and data of the off-track data sectors are stored in the nonvolatile memory 17.

In FIG. 5B, information for the off-track data sectors may be registered in, for example, the property of off-track as information for alternate sectors. For example, the information of the off-track data sectors may be recorded in the nonvolatile memory 17 as the alternate sector area, due to occurrence of the off-track error, as indicated by the right side of FIG. 5B.

During detecting occurrence of the off-track error, data sectors which would be writable if the off-track error does not occur are skipped. More specifically, the data sectors are skipped, as indicated by an arrow 56 in FIG. 5B. Then, data does not be written to data sector areas in the track B, which neighbor the data sectors A4 to A7. If the off-track error ceases to be detected based on the servo data in the servo area 58, in order words, if it is ready to enable the write gate on, data are written to the magnetic disk 1 again. For example, data are written to data sectors B8 and B9.

Figure 5C:
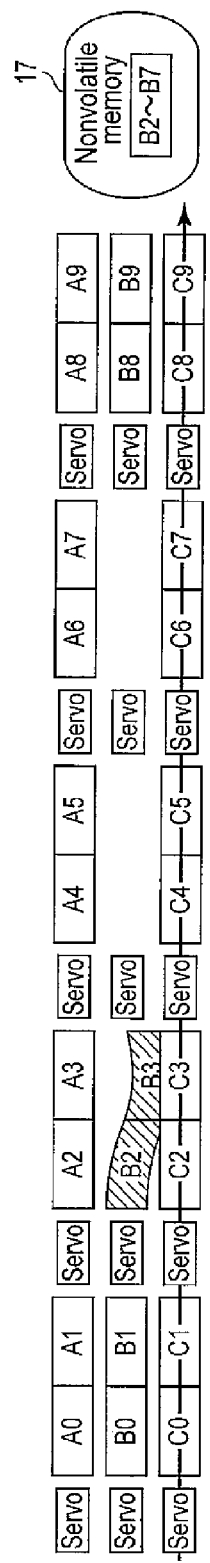

FIG. 5C shows write processing with respect to the track C. As indicated by an arrow in FIG. 5C, since the off-track error does not occur, data are written to data sectors C0 to C9 in the track C.

Note that the off-track is assumed that in a direction of a track which has not been written yet by the shingled write recording method, as described above. More specifically, the off-track indicates the track C which has not been written yet in FIG. 5C. In FIG. 5B, the off-track data sectors are offset in the direction of the track C.

Note that the number of data sectors between neighboring servo areas (for example, between the neighboring servo areas 50 and 51) is not limited to two, as shown in FIGS. 5A, 5B, and 5C.

Read processing upon occurrence of the off-track error corresponding to the write processing described using FIGS. 5A, 5B, and 5C will be described below with reference to FIGS. 6A, 6B, and 6C.

FIG. 6A shows read processing for the track A. On the track A, the off-track error does not occur in the write mode. For this reason, data are read from the data sectors A0 to A9 on the magnetic disk 1.

FIG. 6B shows read processing for the track B. In the read processing for the track B, the off-track error has occurred in the write mode. For this reason, alternate data for data in areas where the off-track error has occurred (alternate sector areas) are read from the nonvolatile memory 17 based on, for example, the property of the off-track. Then, data in data sector areas other than the areas where the off-track error has occurred are read from the magnetic disk 1.

More specifically, after the data sectors B0 and B1 on the track B are read, data for the data sectors B2 to B7 including the off-track data sectors are read, wherein the off-track data sectors are stored in the nonvolatile memory 17. After that, data are read from the data sectors B8 and B9 on the magnetic disk 1.

FIG. 6C shows read processing for the track C. In the read processing for the track C, since the off-track errors do not occur in the write mode as in the case of the read mode for the track A, data are read from the data sectors C0 to C9 on the magnetic disk 1.

As described above, according to the first embodiment, even if an off-track error has occurred upon writing data to the magnetic disk by the shingled write recording method, these data are stored in the nonvolatile memory, thus continuously executing the write processing of the shingled write recording method. A data size stored in the nonvolatile memory is that corresponding to an off-track occurrence period, that is, a data sector interval on the magnetic disk where the off-track error has occurred. For this reason, a decrease in recording density of data in the circumferential direction of the magnetic disk 1 (longitudinal direction of the track) can be suppressed, and a use amount of the nonvolatile memory can also be suppressed.

Second Embodiment

The second embodiment will be described below with reference to the drawings. Note that a description of the same components and functions as those in the first embodiment will not be repeated.

In the second embodiment, if the off-track error has occurred in write processing, data for one track are stored in the nonvolatile memory 17. Note that the data for one track are different from those for one track, which are stored in the DRAM 16, as described above with reference to FIG. 2. As the data for one track, which are described with reference to FIG. 2, read data for one track are stored in the DRAM 16 if the off-track error does not occur. The data for one track stored in the DRAM 16 are used as the ITI cancellation data. On the other hand, as the data for one track stored in the nonvolatile memory 17, data to be written to the magnetic disk 1 are stored in the nonvolatile memory 17 in place of the magnetic disk 1 if the off-track error has occurred.

The second embodiment will be assumed a case in which write processing is executed by the shingled write recording method in which the degree of overlap is higher than the first embodiment. For this reason, unlike in the first embodiment, the ITI cancellation function is used.

Write processing and read processing of the second embodiment will be practically described below with reference to FIGS. 7A, 7B, 7C, 7D, 8A, 8B, and 8C. Note that each of the second, third, and fourth embodiments to be described below have different degrees of overlap between tracks, but FIGS. 7A, 7B, 7C, 7D, 8A, 8B, 8C, 9A, 9B, 9C, 10A, 10B, 10C, 11A, 11B, 11C, 11D, 12A, 12B, 12C, and 12D illustrate tracks which overlap each other to have the same degree of overlap, for the sake of illustrative convenience.

FIGS. 7A, 7B, 7C, and 7D are views for explaining write processing upon occurrence of the off-track error according to the second embodiment.

Figure 7A:
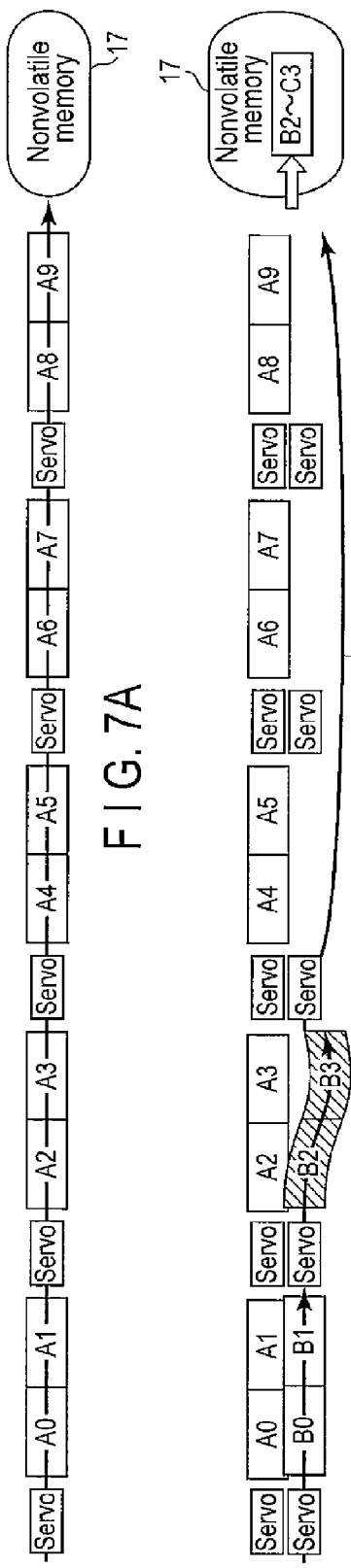
FIGS. 7A, 7B, 7C, and 7D are exemplary views showing a data write method based on the shingled write recording method upon occurrence of an off-track error according to a second embodiment.

FIG. 7A shows write processing for a track A according to the second embodiment. Although not shown, fixed data are written to a track A' before data is written to the track A. The track A is recorded on the magnetic disk 1 to overlap the track A', as shown in FIGS. 3 and 4. As in the first embodiment, the write head 10W moves in a direction of an arrow shown in FIG. 7A. Then, the write head 10W writes data to each of data sectors A0 to A9.

Figure 7B:
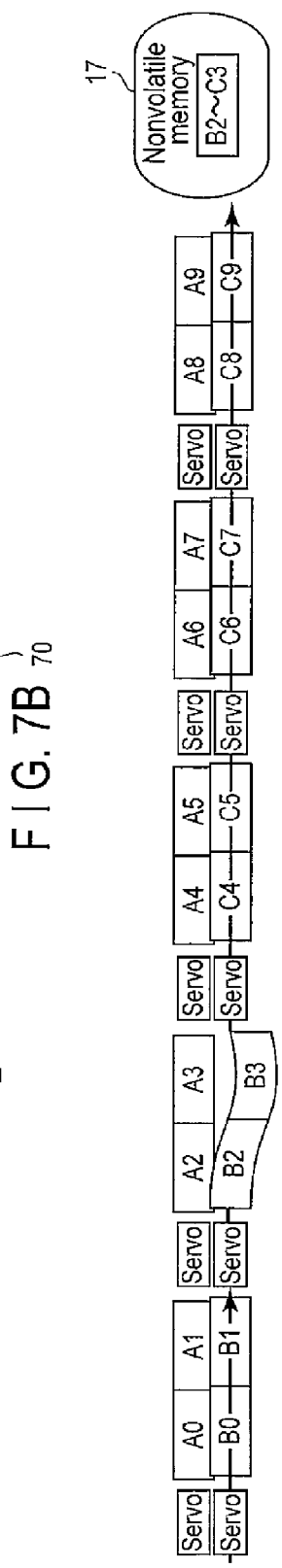

FIG. 7B shows write processing for a track B according to the second embodiment. If it is determined that the off-track error has occurred, data for one track from the off-track data sector (data from a data sector B2 to a data sector C3) are stored in the nonvolatile memory 17. While data for one track are stored in the nonvolatile memory 17, write processing with respect to a data sector interval on the magnetic disk 1, which corresponds to the data for one track, is skipped, as indicated by an arrow 70.

Note that data to be stored in the nonvolatile memory 17 may be that for the number of tracks larger than one track if the cause of the occurrence of the off-track error cannot be eliminated.

Figure 7C:
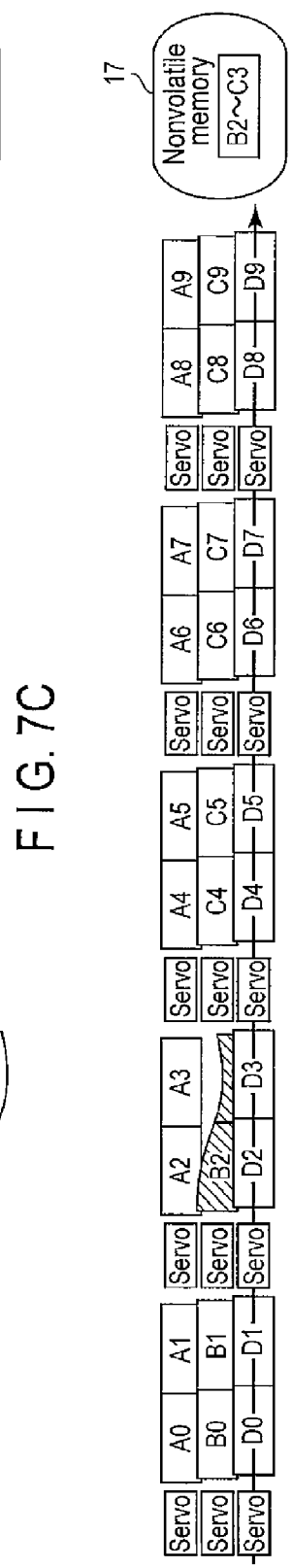

FIG. 7C shows write processing of data with respect to the track B if the data for one track are stored in the nonvolatile memory 17 and an on-track state is detected according to the second embodiment. In this case, for example, write processing of data with respect to the magnetic disk 1 is executed from a start position of a data sector (start data sector) at which the write gate is on after the magnetic disk 1 makes one revolution. More specifically, if the on-track state is detected, the write processing with respect to the magnetic disk 1 is restarted from data sectors (indicated by a data sector C4 (start data sector) and data sector C5 in FIG. 7C) which follow the off-track data sector interval.

Figure 7D:

FIG. 7D shows write processing for a track C according to the second embodiment. If the off-track error does not occur during the write processing for the track B, data (data sectors C0 to C9) to be written to the track C have already been stored on the data track B or the nonvolatile memory 17. For this reason, data to be written to a track D (not shown) are written to the track C, if the off-track error does not occur.

Read processing upon occurrence of the off-track error corresponding to the write processing described in FIGS. 7A, 7B, 7C, and 7D will be described below with reference to FIGS. 8A, 8B, and 8C.

Figure 8A:
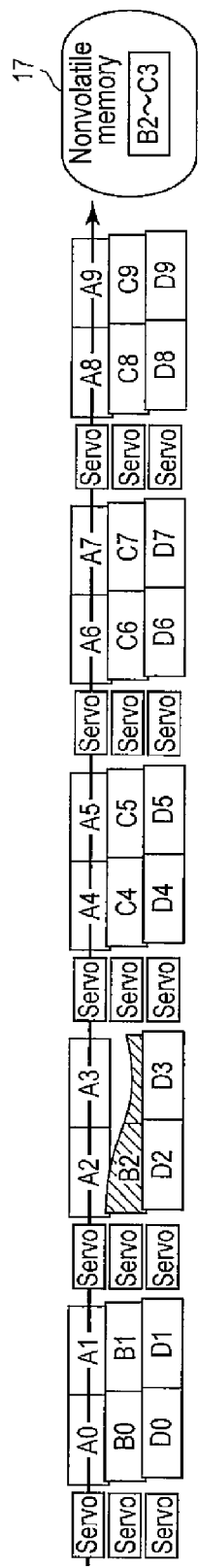
FIGS. 8A, 8B, and 8C are exemplary views showing a read method of data written by the shingled write recording method upon occurrence of the off-track error according to the second embodiment.

FIG. 8A shows read processing for the track A according to the second embodiment. On the track A, the off-track error does not occur in the write mode. For this reason, data in the data sectors A0 to A9 on the magnetic disk 1 are read using data in a fixed data track as the ITI cancellation data.

Figure 8B:
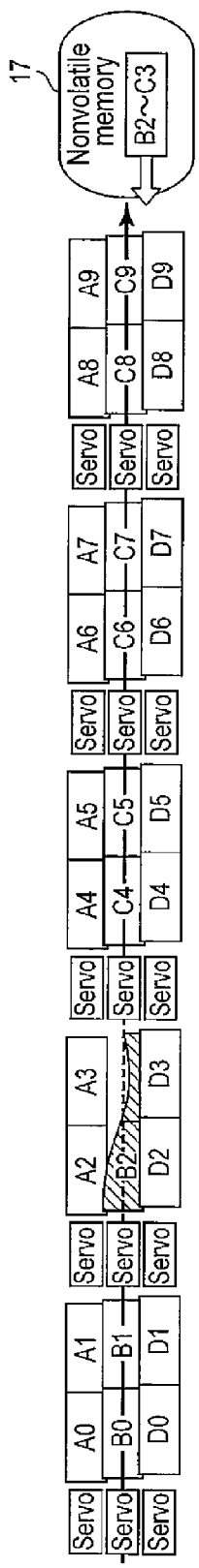

FIG. 8B shows read processing for the track B according to the second embodiment. In the read processing for the track B, the off-track error occurred in the write mode. For this reason, data in the data sectors B0 and B1 are read using the data sectors A0 and A1 as the ITI cancellation data. After that, the read processing of the off-track data sectors on the magnetic disk 1 is slipped. Instead, data in the data sectors B2 to C3 including those on the off-track data sectors, which are stored in the nonvolatile memory 17 are read. After that, data in the data sectors C4 to C9 in the track B on the magnetic disk 1 are read using the data sectors A4 to A9 in the neighboring track as the ITI cancellation data.

Figure 8C:
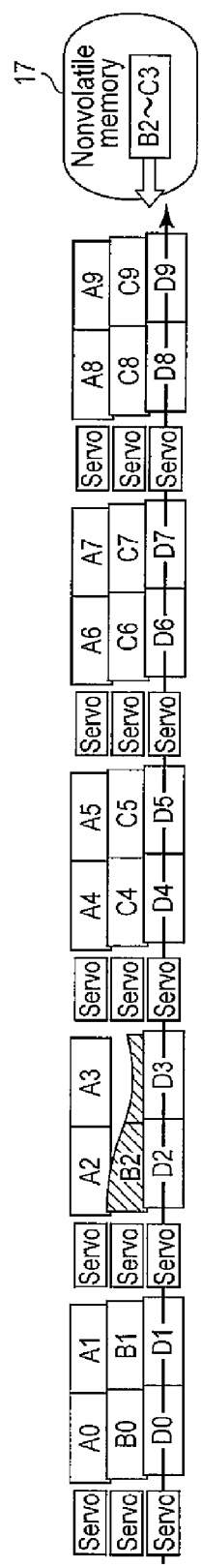

FIG. 8C shows read processing for the track C according to the second embodiment. In the read processing for the track C, the off-track error does not occur in the write mode. For this reason, data in the data sectors D0 to D9 on the magnetic disk 1 are read.

As for the ITI cancellation data upon reading the track C, the data in the data sectors D0 and D1 are read using those on the data sectors B0 and B1 as the ITI cancellation data. The data in the data sectors D4 to D9 are read using those on the data sectors C4 to C9 as the ITI cancellation data.

As for the data in the data sectors D2 and D3, data sectors neighboring the data sectors D2 and D3 include off-track data sectors. For this reason, the data in the data sectors D2 and D3 are read using those on alternate sectors B2 and B3, which are stored in the nonvolatile memory 17, as the ITI cancellation data. Assume that data in the off-track data sectors on the magnetic disk 1 can be read. In this case, the data in the off-track data sectors on the magnetic disk 1 can be used as the ITI cancellation data without using the data in the alternate sectors B2 and B3, which are stored in the nonvolatile memory 17, as the ITI cancellation data.

As described above, according to the second embodiment, even if the off-track error has occurred upon writing data to the magnetic disk by the shingled write recording method, data for one track are stored in the nonvolatile memory 17. Thus, the write processing of the shingled write recording method can be continuously executed. Even if the degree of overlap between neighboring tracks in the shingled write recording method is high, that is, even if a recording density in the radial direction of the magnetic disk 1 is high, interference components can be canceled using the ITI cancellation function. Then, a data playback performance as high as performance in a case that track pitches are not closed up can be maintained. If data are rewritten to the magnetic disk 1 after the off-track error has occurred, data can be written from a neighboring data sector in the same track as the off-track data sectors. For this reason, a decrease in recording density of data in the circumferential direction (longitudinal direction) of the magnetic disk 1 can be suppressed.

Third Embodiment

The third embodiment will be described below with reference to the drawings. Note that a description of the same components and functions as those in the first and second embodiments will not be repeated.

Compared to the first embodiment, the third embodiment is assumed a case in which write processing is executed by the shingled write recording method with a higher degree of overlap than the first embodiment. For this reason, an ITI cancellation function is used, unlike in the first embodiment. In the third embodiment, data to be stored in the nonvolatile memory 17 upon occurrence of the off-track error are not those for one track, unlike in the second embodiment, but are those in the off-track occurrence interval as in the first embodiment.

Write processing and read processing according to the third embodiment will be practically described below with reference to FIGS. 9A, 9B, 9C, 10A, 10B, and 10C.

Figure 9A:
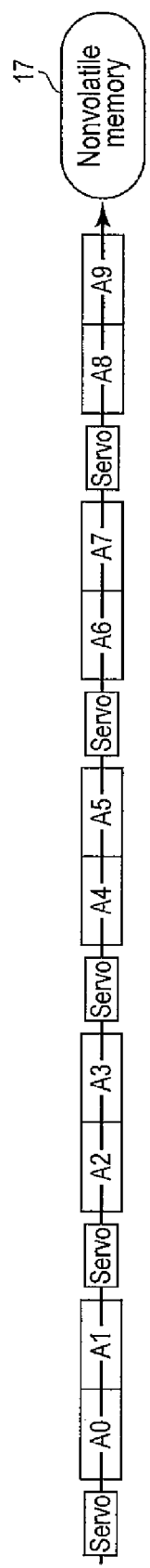
FIGS. 9A, 9B, and 9C are exemplary views showing a data write method based on the shingled write recording method upon occurrence of an off-track error according to a third embodiment.
Figure 9B:
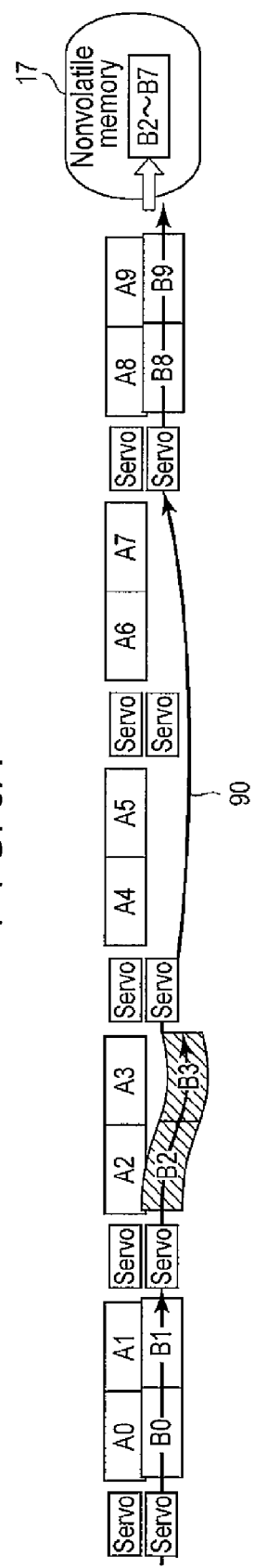
Figure 9C:
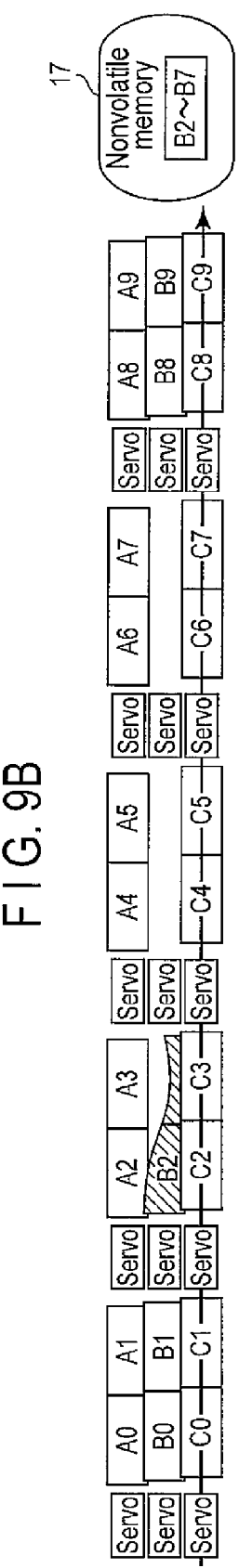

FIGS. 9A, 9B, and 9C are views for explaining write processing upon occurrence of the off-track error according to the third embodiment.

A description of FIG. 9A is the same as that of FIG. 5A described above, and will not be repeated.

FIG. 9B is a view for explaining write processing for a track B. In the third embodiment, write processing is skipped for a data sector interval in which a write gate is disabled. More specifically, after the off-track error has occurred in data sectors B2 and B3, the write processing with respect to the magnetic disk is skipped, as indicated by an arrow 90. Instead, data are stored in the nonvolatile memory 17 as alternate sectors B4 to B7.

A description of FIG. 9C is the same as that of FIG. 5C described above, and will not be repeated.

Read processing upon occurrence of an off-track error corresponding to the write processing described using FIGS. 9A, 9B, and 9C will be described below with reference to FIGS. 10A, 10B, and 10C.

A description of FIG. 10A is the same as that of FIG. 6A described above, and will not be repeated.

FIG. 10B is a view for explaining read processing for the track B. After data sectors B0 and B1 are read, read processing of the off-track data sectors is slipped. Data in the off-track occurrence interval (that indicated by a doted line in FIG. 10B) which does not include the data sectors B2 and B3 are read, so as to use the data in the off-track occurrence interval as neighboring data upon reading a track C. Then, the read data are temporarily stored in a storage medium such as the SRAM, the DRAM 16, or the nonvolatile memory 17. As data in the off-track interval, data of alternate data sectors B2 to B7 in the nonvolatile memory 17 are read.

FIG. 10C shows read processing for the track C. Upon reading data sectors C2 and C3, alternate data sectors B2 and B3 in the nonvolatile memory 17 are used as the ITI cancellation data. However, if the data sectors B2 and B3 can be read, they may be used. Upon reading data sectors C4 to C7, data in data areas 1000 to 1003, indicated by dotted lines, that is, those of the off-track occurrence interval which are temporarily stored upon reading the track B and do not include the data sectors B2 and B3, are used as the ITI cancellation data.

For example, in case that the degree of overlap of the shingled write recording method is 50%, half of the track A overlaps half of the track B. Furthermore, half of the track C overlaps half of the track B. For this reason, the data areas 1000 to 1003 cannot be read by the read head 10R. Such a case is applied to not the third embodiment but the fourth embodiment.

As described above, according to the third embodiment, even if the off-track error has occurred upon writing data to the magnetic disk 1 by the shingled write recording method, data for one track are stored in the nonvolatile memory 17. Thus, the write processing of the shingled write recording method can be continuously executed. Using the ITI cancellation function, interference components can be canceled. Then, a data reproduction performance as high as that when track pitches are not closed up by the shingled write recording method can be maintained. A data size to be stored in the nonvolatile memory 17 is that corresponding to an off-track occurrence period, that is, a data sector interval on the magnetic disk 1 where the off-track error has occurred. For this reason, a decrease in recording density of data in the circumferential direction (longitudinal direction) of the magnetic disk 1 can be suppressed, and a use amount of the nonvolatile memory 17 can also be suppressed.

Fourth Embodiment

The fourth embodiment will be described below with reference to the drawings. Note that a description of the same components and functions as those in the first to third embodiments will not be repeated.

The fourth embodiment is assumed a case in which data in the data areas 1000 to 1003 shown in FIG. 10C cannot be read normally, that is, cannot be read normally to a level at which they can be used as the ITI cancellation data in the read processing of the third embodiment. In such a case, in the fourth embodiment, fixed pattern data which can be used as the ITI cancellation data are written in a track which neighbors the data areas 1000 to 1003.

Write processing and read processing of the fourth embodiment will be practically described below with reference to FIGS. 11A, 11B, 11C, 11D, 12A, 12B, 12C and 12D.

FIGS. 11A, 11B, 11C, and 11D are views for explaining write processing upon occurrence of the off-track error according to the fourth embodiment.

Descriptions of FIGS. 11A and 11B are the same as those of FIGS. 9A and 9B described above, and will not be repeated.

FIG. 11C is a view for explaining write processing for a track C. Fixed pattern data (indicated by "fixed a" to "fixed f" in FIG. 11C) are written in data sectors in the track C, which neighbor the off-track occurrence interval (indicated by data sectors B2 and B3 and data areas 1000 to 1003 in FIG. 11C).

The fixed pattern data are those of predetermined repetitive patterns or the like. The fixed pattern data may be the same as fixed data in the fixed data track described above with reference to FIG. 3, but they may be different data. The fixed pattern data are those which are written in data sectors which neighbor the off-track occurrence interval. On the other hand, the fixed data are those, which are written first by the shingled write recording method, and are required to read data in a track A using the ITI cancellation function in the write order by the shingled write recording method.

FIG. 11D is a view for explaining write processing for a track D which data is written after being written to the track C by the shingled write recording method. As indicated by an arrow in FIG. 11D, data are written in data sectors D0 to D9 without causing the off-track error.

Read processing upon occurrence of the off-track error corresponding to the write processing described using FIGS. 11A, 11B, 11C, and 11D will be described below with reference to FIGS. 12A, 12B, 12C, and 12D.

Figure 12A:
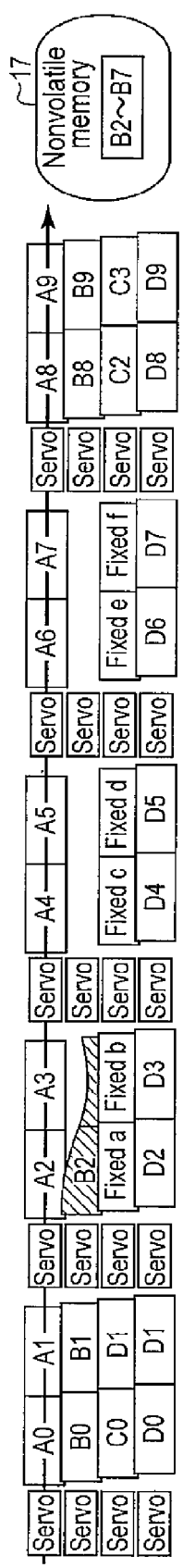
Figure 12B:
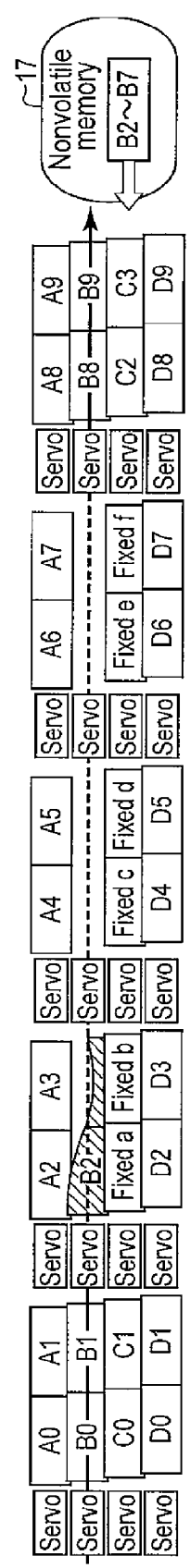

Descriptions of FIGS. 12A and 12B are the same as those of FIGS. 10A and 10C described above, and will not be repeated.

FIG. 12C is a view for explaining read processing for the track C. Read processing of data in data sector areas indicated by "fixed a" to "fixed f" are slipped.

FIG. 12D is a view for explaining read processing for the track D. Data in the data sectors D2 to D7 are read, using the ITI cancellation function which uses the predetermined neighboring fixed pattern data ("fixed a" to "fixed f").

As described above, according to the fourth embodiment, even when the off-track error has occurred upon writing data to the magnetic disk 1 by the shingled write recording method, the write processing of the shingled write recording method can be continuously executed by storing data in the nonvolatile memory 17. Even if the degree of overlap between neighboring tracks in the shingled write recording method is high, that is, even if the recording density in the radial direction of the magnetic disk 1 is high, interference components can be canceled using the ITI cancellation function. For this reason, a data playback performance as high as that when track pitches are not closed up by the shingled write recording method can be maintained.

Fifth Embodiment

The fifth embodiment will be described below with reference to the drawings. Note that a description of the same components and functions as those in the first to fourth embodiments will not be repeated.

The fifth embodiment relates to read processing and write processing in the shingled write recording method as a combination of some of four modes corresponding to the first to fourth embodiments.

The four modes will be described first with reference to FIG. 13.

Elements of FIG. 13 will be explained first.

"Write processing at off-track error timing" indicates whether or not write processing upon occurrence of the off-track error is to be executed while data are written to the magnetic disk 1 by the shingled write recording method. As shown in FIG. 13, in all the four modes, even if the off-track error has occurred, the write processing is continuously executed without being interrupted.

"ITI cancellation function" indicates whether or not to use the ITI cancellation function. As for the three modes other than the mode 1 corresponding to the first embodiment, the ITI cancellation function is used.

The term "tracks per inch" (TPI) indicates a unit of a track density on the magnetic disk 1, and the number of tracks per inch in the radial direction of the magnetic disk 1. The TPI will be described below using the mode 3 corresponding to the third embodiment as a reference.

In mode 1, since the degree of overlap between tracks is low, the value of the TPI in the mode 1 is low.

In the mode 3 corresponding to the third embodiment, if the degree of overlap between tracks is large, data in the off-track occurrence interval cannot be read from the magnetic disk 1 as the ITI cancellation data. On the other hand, in the mode 2, even if the degree of overlap between tracks is 50% or more, since data in the off-track occurrence interval are stored in the nonvolatile memory 17, the data in the off-track occurrence interval can be used as the ITI cancellation data. For this reason, in the mode 2, a larger value of the TPI than the mode 3 can be set.

In the mode 4, the fixed pattern data can be used as the ITI cancellation data. For this reason, the degree of overlap between tracks can be increased, and a larger value of the TPI than the mode 3 can be set, in the mode 4.

"Data efficiency in circumferential direction" indicates efficiency of data recording in the circumferential direction of the magnetic disk 1. That is, if data are effectively recorded in the circumferential direction, the data efficiency in the circumferential direction increases. In FIG. 13, in the mode 4, write processing for the off-track occurrence interval is skipped, and the fixed pattern data are written in the track which neighbors the off-track occurrence interval. For this reason, the data efficiency in the circumferential direction in the mode 4 is lower than those in the modes 1 to 3.

"NAND use amount" indicates amount used for NAND flash memory which is one of examples of the nonvolatile memory 17. The NAND use amount will be described below using the mode 1 and the mode 3 corresponding to the first embodiment and the third embodiment as a reference.

In the mode 1 and the mode 3, data corresponding to an interval that the write-gate is disabled (as referred to a write-gate disabled interval, below) are stored in the nonvolatile memory 17.

Next, in the mode 4, data corresponding to only the write-gate disabled interval, or data corresponding to the write-gate disabled interval and data sectors which neighbor the write-gate disabled interval, is stored in the nonvolatile memory 17. Note that data corresponding to data sectors which neighbor the write-gate disabled interval are the aforementioned fixed pattern data. In this embodiment, the fixed pattern data is written to the magnetic disk 1, and may or may not be stored in the nonvolatile memory 17.

In the mode 2, since data for one track are stored in the nonvolatile memory 17, the NAND use amount is larger than those in modes 1, 3, and 4.

Write processing and read processing according to the fifth embodiment will be described below with reference to FIGS. 14 and 15.

Figure 14:
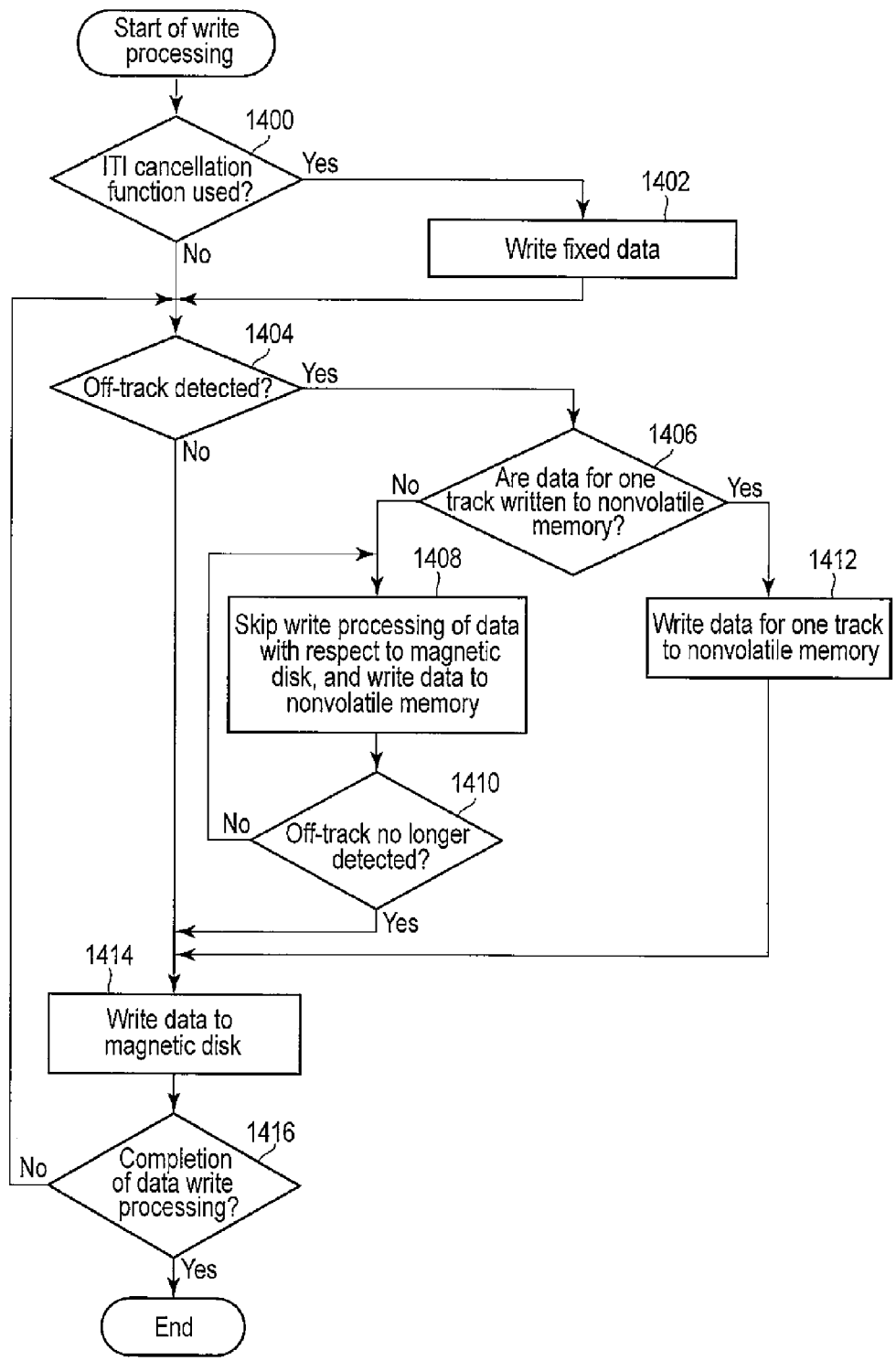
FIG. 14 is an exemplary flowchart showing a write processing sequence of the shingled write recording method upon occurrence of the off-track error according to the fifth embodiment.

FIG. 14 is a flowchart showing an example of the write processing sequence according to the fifth embodiment.

The write processing starts by data to be written to the magnetic disk 1 are sent from the host system 20 to the interface controller 13, or the like.

The interface controller 13 determines in block 1400 whether or not to use the ITI cancellation function. If the ITI cancellation function is used, the interface controller 13 writes the fixed data track to the magnetic disk 1 in block 1402, and the process advances to block 1404. If it is determined in block 1400 that the ITI cancellation function is not used (the mode 1), since the fixed data need not always be written, the process advances to block 1404. Note that processing in block 1402 is an example of processing if the ITI cancellation function is not used, and the fixed data may be written in advance to the magnetic disk 1 before the beginning of the write processing.

Note that whether or not to use the ITI cancellation function in block 1400 may be selected by the user. Alternatively, prior to the beginning of the write processing, if, for example, a bit error rate of read data is high, it may be set in advance to use the ITI cancellation function.

The off-track determination module 27a determines in block 1404 based on the off-track determination signal whether or not the off-track error has been detected. If the off-track error does not be detected, the process advances to block 1414 to continue the write processing of data with respect to the magnetic disk 1. If it is determined that the off-track error has been detected, the write data selector 21a determines in block 1406 whether or not data to be stored in the nonvolatile memory 17 are those for one track. If data for one track are to be stored in the nonvolatile memory 17 (the mode 2), the process advances to block 1412, and the write data selector 21a executes processing required to store the data for one track in the nonvolatile memory 17.

If data for one track are not to be stored in the nonvolatile memory 17 (the mode 1, the mode 3, and the mode 4), the process advances to block 1408. In block 1408, the write module 21 executes processing required to skip the write processing in the off-track occurrence interval of the magnetic disk 1, and the write data selector 21a executes processing required to write data corresponding to the off-track occurrence interval in the nonvolatile memory 17 as alternate data. The process then advances to block 1410, and the write data selector 21a determines whether or not the off-track error ceases to be detected. If the off-track error ceases to be detected, the write processing of data with respect to the magnetic disk 1 is restarted in block 1414.

Finally, the interface controller 13 determines in block 1416 whether or not the write processing of all data sent from the host system 20 is complete. If the write processing is not complete yet, the process returns to block 1404.

FIG. 15 is a flowchart showing an example of the read processing sequence according to the fifth embodiment.

Initially, for example, if a read request of data from the magnetic disk 1 is received from the host system 20, the read processing starts.

The read module 22 determines in block 1500, based on the property of the off-track and the like, whether or not data sectors (off-track occurrence interval) where the off-track error occurred and which include write-skipped data sectors, are to be read. If the off-track error is detected, data are read from the nonvolatile memory 17 in block 1508 (the modes 1 to 4).

If the off-track occurrence interval is not read in block 1500, the process advances to block 1502 to determine whether or not to use the ITI cancellation function. If the ITI cancellation function is used (the mode 1), the read module 22 executes processing required to read data from the magnetic disk in block 1506.

If the ITI cancellation function is used (the mode 2, the mode 3, and the mode 4), it is determined in block 1503 whether or not the fixed data has already been written. If the fixed data has already been written (the mode 4), the read processing of data sectors in which the fixed data are written is slipped in block 1505. Next, in block 1504, data which have already been read from the magnetic disk 1 and are temporarily stored in the DRAM 16, or data which are stored in the nonvolatile memory 17 and in correspondence with the off-track occurrence interval, are used as the ITI cancellation data. Then, data on the magnetic disk 1 are read while canceling interference components from data sent from the magnetic disk 1. Finally, the interface controller 13 determines, based on a read request or the like from the host system 20, whether or not the read processing of all data is complete.

As described above, according to the fifth embodiment, some of the four modes of the read processing and write processing of the shingled write recording method are combined, thus switching the ITI cancellation function. Also, the mode to be used can be switched according to the use amount of the nonvolatile memory, the use efficiency of the magnetic disk, and the like.

As described above, according to the first embodiment to the fifth embodiment, the write processing based on the shingled write recording method can be executed without lowering a write performance with respect to the magnetic disk by the shingled write recording method (that is, without lowering variations of the write performance based on the shingled write recording method). For example, in case that the write gate is disabled and the write processing with respect to the magnetic disk 1 cannot be executed, data sectors which follow the off-track occurrence data sectors are used as the alternate data sectors, and data in the off-track occurrence data sectors are written in the nonvolatile memory 17, thus suppressing a write performance drop. Since the nonvolatile memory 17 is used, the write processing is not delayed although the write processing with respect to the magnetic disk 1 is interrupted, and it can be expected that the write processing is complete within a predetermined time period. Also, since the nonvolatile memory 17 is used, even if the off-track error has occurred, data in the off-track occurrence interval need not be written again (overwritten) to identical data sectors of the magnetic disk 1. For this reason, the number of writings to the magnetic disk 1 can be suppressed. That is, the write processing need not be interrupted, if the off-track error has occurred, until the magnetic disk 1 makes one revolution and until the write processing for next data sectors which follow the off-track occurrence data sectors is ready to be executed. Since the number of writings is suppressed, the influence of read processing due to magnetic interference on neighboring tracks can be eliminated.

Note that in any of the first embodiment to the fifth embodiment, for example, a hybrid hard disk (HDD) which incorporates a high-speed and large-capacity nonvolatile memory, or the like, may be applied.

The various modules of the systems described herein can be implemented as software applications, hardware and/or software modules, or components in one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a magnetic disk, wherein data is written while a first set of neighboring tracks of the magnetic disk partially overlap each other;
   a nonvolatile memory;
   a buffer memory storing data to be written in the magnetic disk or in the nonvolatile memory; and a controller configured to:
  detect an off-track error with regard to data sectors of the magnetic disk;
  write first data read from the buffer memory in a first data sector of the magnetic disk;
  write the first data read from the buffer memory in the nonvolatile memory when an off-track error with regard to the first data sector is detected;
  write second data read from the buffer memory in the nonvolatile memory when the off-track error with regard to the first data sector is detected, the second data scheduled to be written in a second data sector of the magnetic disk, the second data sector being next to the first data sector, and the scheduled writing of the second data to the second data sector being skipped;
  write third data read from the buffer memory in the nonvolatile memory when the off-track error with regard to the first data sector is detected, the third data scheduled to be written in one round of a track of the magnetic disk including the first data sector; and
  read the first data from one of the magnetic disk and the nonvolatile memory based on whether the off-track error is detected with regard to the first data sector.

2. The magnetic disk apparatus of claim 1, wherein the controller is configured to cancel noise generated between a second set of neighboring tracks using the first data.

3. The magnetic disk apparatus of claim 1, wherein the controller is configured to write fixed data in a data sector which is adjacent to the first data sector, and cancel noise generated between a second set of neighboring tracks using the fixed data.

4. The magnetic disk apparatus of claim 1, wherein the controller is configured to cancel noise generated between a second set of neighboring tracks using the first data read from the nonvolatile memory.

5. A write control method in a magnetic disk apparatus comprising a magnetic disk, a nonvolatile memory, and a buffer memory storing data to be written in the magnetic disk or in the nonvolatile memory, wherein the data read from the buffer memory is written while a first set of neighboring tracks of the magnetic disk partially overlap each other, the method comprising:
  detecting an off-track error with regard to data sectors of the magnetic disk;
  writing first data read from the buffer memory in a first data sector of the magnetic disk;
  writing the first data read from the buffer memory in the nonvolatile memory when an off-track error with regard to the first data sector is detected;
  writing second data read from the buffer memory in the nonvolatile memory when the off-track error with regard to the first data sector is detected, the second data scheduled to be written in a second data sector of the magnetic disk, the second data sector being next to the first data sector;
  skipping the scheduled writing of the second data to the second data sector;
  writing third data read from the buffer memory in the nonvolatile memory when the off-track error with regard to the first data sector is detected, the third data scheduled to be written in one round of a track of the magnetic disk including the first data sector.

6. The method of claim 5, further comprising:
  canceling noise generated between a second set of neighboring tracks using the first data.

7. The method of claim 5, further comprising:
  writing fixed data in a data sector which is adjacent to the first data sector, and
  canceling noise generated between a second set of neighboring tracks using the fixed data.

8. The method of claim 5, further comprising:
  reading the first data from the nonvolatile memory; and
  cancelling noise generated between a second set of neighboring tracks using the first data read from the nonvolatile memory.

9. A controller for a magnetic disk device comprising a magnetic disk and a nonvolatile memory, wherein data is written while a first set of neighboring tracks of the magnetic disk partially overlap each other, the controller configured to:
  detect an off-track error with regard to data sectors of the magnetic disk;
  write first data read from a buffer memory for storing data to be written in the magnetic disk or the nonvolatile memory, in a first data sector of the magnetic disk;
  write the first data read from the buffer memory in the nonvolatile memory when the off-track error with regard to the first data sector is detected;
  write second data read from the buffer memory in the nonvolatile memory when the off-track error with regard to the first data sector is detected, the second data scheduled to be written in a second sector of the magnetic disk, and the second data sector being next to the first data sector;
  skip the scheduled writing of the second data to the second data sector;
  write third data read from the buffer memory in the nonvolatile memory when the off-track error with regard to the first data sector is detected, the third data scheduled to be written in one round of a track of the magnetic disk including the first data sector, and
  read the first data from one of the magnetic disk and the nonvolatile memory based on whether the off-track error is detected with regard to the first data sector.

10. The controller of claim 9, wherein the controller is configured to cancel noise generated between a second set of neighboring tracks using the first data.

11. The controller of claim 9, wherein the controller is configured to write fixed data in a data sector which is adjacent to the first data sector, and cancel noise generated between a second set of neighboring tracks using the fixed data.

12. The controller of claim 9, wherein the controller is further configured to cancel noise generated between a second set of neighboring tracks using the first data read from the nonvolatile memory.

* * * * *